United States Patent
Wiest et al.

(10) Patent No.: US 7,448,282 B2
(45) Date of Patent: Nov. 11, 2008

(54) DEVICE FOR DETERMINING AND/OR MONITORING VOLUME AND/OR MASS FLOW OF A MEDIUM

(75) Inventors: Achim Wiest, Weil am Rhein (DE); Andreas Berger, Therwil (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/666,659

(22) PCT Filed: Oct. 25, 2005

(86) PCT No.: PCT/EP2005/055553

§ 371 (c)(1), (2), (4) Date: Oct. 1, 2007

(87) PCT Pub. No.: WO2006/048395

PCT Pub. Date: May 11, 2006

(65) Prior Publication Data

US 2008/0060448 A1   Mar. 13, 2008

(30) Foreign Application Priority Data

Nov. 3, 2004   (DE) .................. 10 2004 053 673

(51) Int. Cl.
  *G01F 1/66*   (2006.01)
(52) U.S. Cl. .................................. 73/861.28
(58) Field of Classification Search .............. 73/861.28, 73/861.25, 861.26
  See application file for complete search history.

(56) References Cited

U.S. PATENT DOCUMENTS

| 5,341,345 | A | * | 8/1994 | Warner et al. ................. 367/99 |
| 5,650,572 | A |   | 7/1997 | Vontz |
| 5,770,800 | A | * | 6/1998 | Jenkins et al. ................ 73/623 |
| 6,178,827 | B1 |  | 1/2001 | Feller |
| 7,289,914 | B2 | * | 10/2007 | Hishida et al. ................ 702/39 |

FOREIGN PATENT DOCUMENTS

| DE | 198 08 642 C1 | 8/1999 |
| EP | 0 477 418 A1 | 4/1992 |
| JP | 11-201790 | 7/1999 |

\* cited by examiner

*Primary Examiner*—Jewel V Thompson
(74) *Attorney, Agent, or Firm*—Bacon & Thomas, PLLC

(57) ABSTRACT

A device for determining and/or monitoring volume and/or mass flow rate of a medium that flows in a direction of flow through a pipeline/measuring tube of inner diameter. The device comprises at least two ultrasonic transducers that emit and/or receive ultrasonic measuring signals along defined sonic paths and a control/evaluation device which determines the volume flow rate and/or the mass flow rate of the medium to be measured inside said pipeline/measuring tube based on the ultrasonic measuring signals according to the travel-time difference principle. In order to provide a multichannel ultrasonic flowmeter, at least one reflector element is placed in the interior of the pipeline/measuring tube. The reflector element has a defined distance from the inner surface of the pipeline/measuring tube and is placed within the sonic path of the ultrasound measuring signals running through the pipeline/measuring tube.

13 Claims, 5 Drawing Sheets

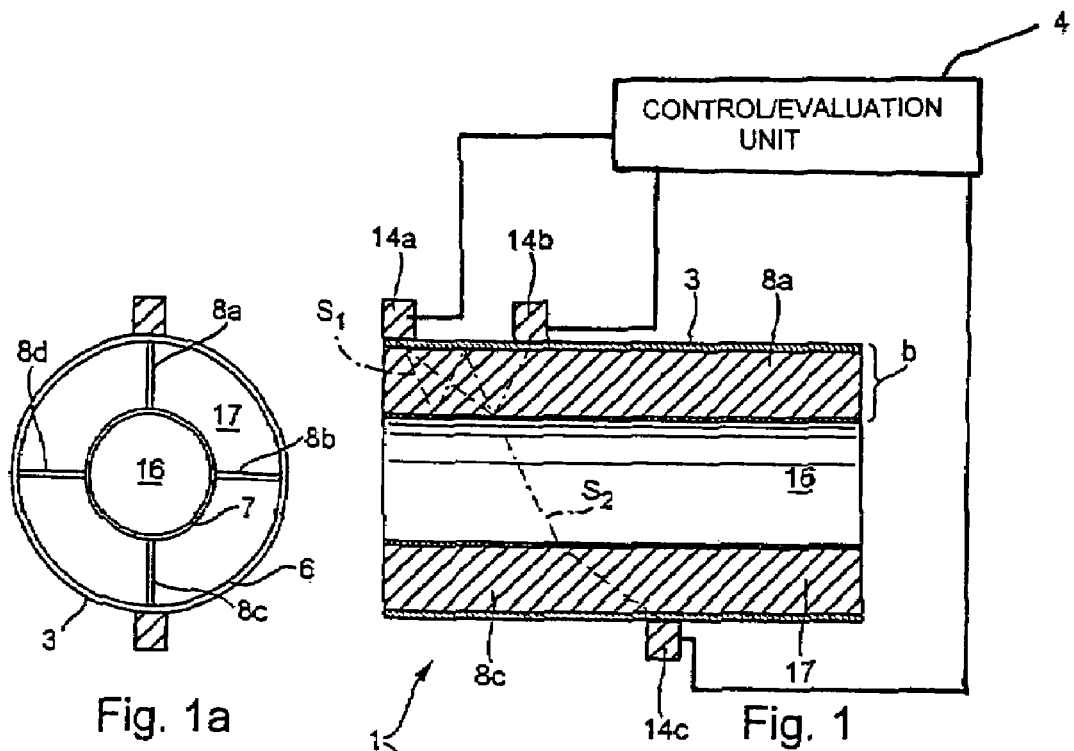
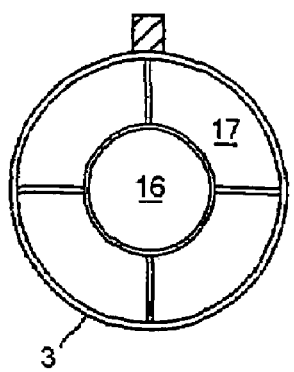
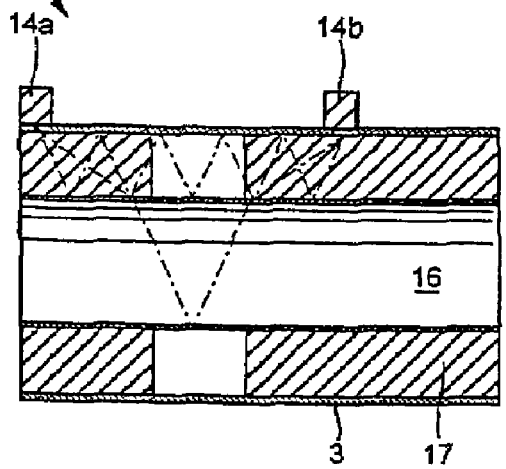

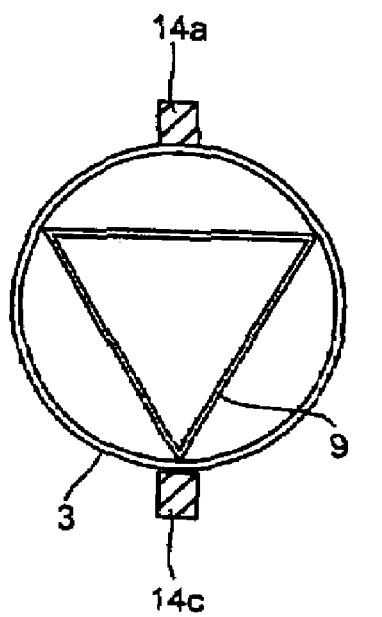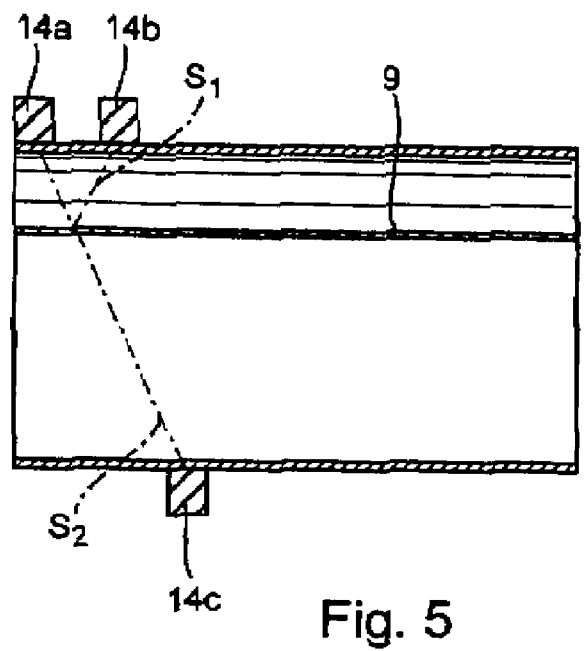
Fig. 5a
Fig. 5

DEVICE FOR DETERMINING AND/OR MONITORING VOLUME AND/OR MASS FLOW OF A MEDIUM

FIELD OF THE INVENTION

The invention relates to a device for determining and/or monitoring volume- and/or mass-flow, e.g. flow rate, of a medium flowing through a containment such as a pipeline.

BACKGROUND DISCUSSION

The pipeline has a predetermined inner diameter in a predetermined flow direction and includes: At least two ultrasonic transducers, which emit, or transmit, and/or receive ultrasonic measuring signals along defined sound paths; and a control/evaluation unit, which ascertains volume and/or mass flow of the medium in the containment using the ultrasonic measuring signals based on the travel-time difference principle. The measured medium can be gaseous or liquid. The flow measuring device is either a clamp-on device or an inline device installed into the pipeline.

Ultrasonic flow measuring devices of the above-described kind for ascertaining volume flow by means of the so-called travel-time-difference method are often applied in process and automation technology. Especially clamp-on flow measuring devices have the advantage of enabling ascertainment of volume flow in a containment, e.g. in a pipeline, contactlessly, i.e. without needing to contact the medium. Clamp-on flow measuring devices are described, for example, in EP 0 686 255 B1, U.S. Pat. No. 4,484,478, DE 43 35 369 C1, DE 298 03 911 U1, DE 4336370 C1 or U.S. Pat. No. 4,598,593.

In the case of both types of ultrasonic flow measuring devices, the ultrasonic measuring signals are radiated at a predetermined angle into, respectively received from, the containment in which the medium is located. The positions of the ultrasonic transducers on the measuring tube, in the inline case, and on the pipeline, in the clamp-on case, depend on the inner diameter of the pipe, or tube, and on the velocity of sound in the medium being measured.

For a clamp-on measuring device, additionally the application parameters, wall thickness of the pipeline and velocity of sound in the material of the pipeline, must be taken into consideration.

Essential component of an ultrasonic transducer is usually a piezoelectric element. The ultrasonic measuring signals produced or received by the piezoelectric element are led into and out of the interior of the pipeline, or measuring tube, as the case may be, via a coupling wedge, or interfacing shoe, and, in the case of a clamp-on measuring device, via the pipe wall.

Usually, in the case of both types of ultrasonic flow measuring devices, the two ultrasonic transducers are so arranged that the traversing sound paths are sent through the central region of the pipeline, or measuring tube, as the case may be. The ascertained flow measurement value thus reflects an average flow of the medium in the pipeline, or measuring tube. In many applications, especially in the case of flow measurements in pipelines of large nominal diameter, this averaging is, however, too inexact. Therefore, it is also known in the case of inline flow measuring devices to provide at the measuring tube a plurality of sensor pairs distributed over the periphery of the measuring tube, whereby flow information from various segmented, angular regions of the measuring tube can be made available. Of course, this solution is naturally relatively expensive, due to the increased number of sensor pairs.

Corresponding, multipath, or multichannel, arrangements for segmented flow measurement have not been introduced in the case of clamp-on flow measuring devices. Instead, in the case of clamp-on flow measuring devices, the sound paths always go through the central region of the pipeline, whereby the flow is provided integrated over all regions of the pipeline. In order, however, to obtain the flow profile exactly, it is necessary to direct the sound paths through predetermined segments of the pipeline, or measuring tube, as the case may be. If an aggressive medium is being measured, or if there is no possibility of using an inline flow measuring device, then other measurement principles must be resorted to, since known clamp-on flow measuring devices exhibit a relatively low, measurement accuracy.

SUMMARY OF THE INVENTION

An object of the invention is to provide an ultrasonic flow measuring device that makes available a segmented flow rate dependent on the inner diameter of the pipeline, or measuring tube, as the case may be.

The object is achieved by the features that at least one reflector element is provided in the interior of the pipeline, that the reflector element has a defined separation from the inner surface of the pipeline, and that the reflector element is arranged in a sound path of ultrasonic measuring signals extending in the pipeline. The reflector element is embodied and/or arranged in such a manner that it interrupts the sound path and deflects an ultrasonic measuring signal at locations of interest from a measurements point of view. Consequently, an ultrasonic measuring signal carries information only from a traversed spatial region of the measuring tube, or pipeline, as the case may be.

In the case of inline flow measuring devices, the solution of the invention provides a completely new direction for segmented measurement of the flow profile of the medium being measured in the measuring tube. In contrast to the long term situation in which the sound paths in different segments of the measuring tube, e.g. in the central region and in various edge regions, were defined by arranging a plurality of sensor pairs at various angular positions over the periphery of the measuring tube, in the case of the invention, the sound paths are implemented by suitable arrangement of reflector elements in the measuring tube on the basis of the particular instance of application. In principle, one pair of sensors can already be adequate in the solution of the invention for providing information concerning the flow profile of the medium being measured in the measuring tube. And, the solution of the invention provides, for the first time, the ability to implement a multipath, clamp-on, flow measuring device.

In the invention, the reflector element, or elements, can be embodied in any way. In one embodiment, the at least one reflector element is a tubular element. Preferably, the tubular element, or elements, is/are arranged concentrically in the pipeline.

An advantageous further development of the device of the invention provides that the tubular element, or elements, is/are affixed via struts to the inner surface of the pipeline, or measuring tube, as the case may be. In this embodiment, it becomes possible to eliminate certain edge regions from the measurement of the flow. The strut acts in this form of embodiment as a sound conductor. In turn, the sound conductor is interrupted at locations interesting from a measurements point of view. Possible, in this way, is, for example, a flow measurement only in the central, or core, region of the pipeline, or measuring tube, as the case may be.

In an alternative embodiment, the reflector element, or elements, is/are embodied in disk form. Again, the reflector element, or elements, is/are affixed via one or more struts to the inner surface of the pipeline, or measuring tube, as the case may be. In this case, the reflector element and strut/struts are embodied in essentially T-shape. An advantageous further development of the device of the invention provides, again, that the ultrasonic transducers and the struts are so arranged with respect to one another that the ultrasonic measuring signals can be coupled into, or out of, the interior of the tubular element via the struts. By this embodiment, the flow in a desired segment can be measured, since, in each case, the region, in which the struts are located, is kept out of the flow measurement.

Alternatively to a tubular embodiment with round cross section, the tubular element can also exhibit an n-polygonal cross section, wherein n is a natural number with n greater $\geq 3$. Preferably, the tubular, n-polygonal element is so embodied that its outer diameter corresponds essentially to the inner diameter of the pipeline, and the tubular element is connected with the pipeline in the regions of the vertices.

In a preferred form of embodiment of the device of the invention, the reflector element or elements is/are one or more disk-shaped platelets, which are so embodied and/or arranged that they represent negligible flow resistance for the flowing medium. In order to measure the flow within various segments of the pipeline, or measuring tube, as the case may be, for example, a plurality of platelets are arranged in the form of mutually spaced steps of a ladder.

Alternatively, it is possible to arrange the platelets on a helix, or spiral. In this connection, an advantageous embodiment of the device of the invention provides a control unit, via which the disk-shaped reflector platelet, or platelets, is/are movable into and out of, the sound path. As already stated, the platelets can be arranged either in spiral form or as mutually spaced rungs of a ladder structure.

In order to register the ultrasonic measuring signals from different spatial regions, it is usually necessary to use a corresponding number of ultrasonic transducers arranged offset from one another. Alternatively, the at least two ultrasonic transducers needed for an evaluation via a travel-time difference can be so embodied that they emit and/or receive the ultrasonic measuring signals, or sound fields, as the case may be, over a predetermined spatial region. If the ultrasonic measuring signals are emitted and received within an aperture angle tuned to the particular application, then usually one sensor pair is sufficient for making available, according to the invention, the flow information from different segments of the pipeline, or measuring tube, as the case may be.

In an alternative embodiment, it is provided that the ultrasonic transducers have a plurality of piezoelectric elements as emitting and/or receiving elements, with the emitting and/or receiving elements being arranged in an array.

By suitable activation of the emitting and/or receiving elements, it is possible to implement different radiating, respectively receiving, angles and thus sound paths with different angular directions.

BRIEF DESCRIPTION OF THE DRAWINGS

The invention will now be explained in greater detail on the basis of the appended drawings, the figures of which show as follows:

FIG. 1 a longitudinal section through a first embodiment of the device of the invention, with three ultrasonic sensors and in and out coupling via struts;

FIG. 1*a* a cross section of the embodiment of the device of the invention shown in FIG. 1;

FIG. 2 a longitudinal section through a second embodiment of the device of the invention, with two ultrasonic sensors and in and out coupling via struts;

FIG. 2*a* a cross section of the embodiment of the device of the invention shown in FIG. 2;

FIG. 5 a longitudinal section through a fifth embodiment of the device of the invention with three ultrasonic sensors and a tubular reflector with triangular cross section;

FIG. 5*a* a cross section of the embodiment of the device of the invention shown in FIG. 5;

DETAILED DISCUSSION

Figure 3A:
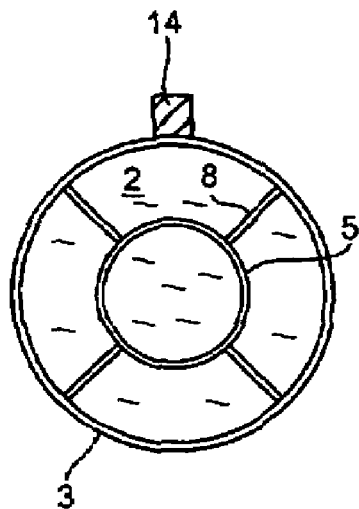
FIG. 3*a* a cross section of the embodiment of the device of the invention shown in FIG. 3.

FIG. 1 shows a longitudinal section through a first embodiment of the device 1 of the invention with three ultrasonic sensors or transducers 14*a*, 14*b*, 14*c*. The activating of the ultrasonic transducers 14*a*, 14*b*, 14*c*, as well as the evaluation of the ultrasonic measuring signals via the travel-time method occurs in the control/evaluation unit 4.

In the case of the embodiment shown in FIGS. 1 (longitudinal section) and FIG. 1*a* (cross section), the tubular reflector element 5 with round cross section is arranged concentrically with the pipeline/measuring tube 3. Tubular reflector element 5 includes four struts on its outer surface 7. Via the struts 8, the tubular reflector element 5 is affixed to the inner surface 6 of the pipeline/measuring tube 3.

In the illustrated embodiment, the ultrasonic sensors 14*a*, 14*b* are so arranged that a part of the ultrasonic measuring signals is coupled in, or out, as the case may be, via the struts 8*a*, 8*c*. By this embodiment, it is thus possible to omit from the flow measurement the region of the interior 15 of the pipeline/measuring tube 3 defined by the breadth b of the struts 8*a*, 8*c*. Preferably this is done by subtraction of the travel time (calculable on the basis of the known parameters) of the ultrasonic measuring signals on the sound path S1 in the strut 8a from the measured travel time required by the ultrasonic measuring signals for traversing the sound path S2. Sound path S1 runs between the two ultrasonic transducers 14a, 14b arranged on a line parallel to the longitudinal axis of the pipeline/measuring tube 3; sound path S2 runs between the two ultrasonic transducers 14a, 14c lying on opposite sides of the pipeline/measuring tube 3. With this above-described embodiment, it is possible to ascertain the flow of the measured medium 2 in the central region of the pipeline/measuring tube 3. In the case of such a construction, the value of the measured flow relative to the average flow of the measured medium 2 is largely independent of the Reynolds number. Therefore, this embodiment can be well applied for ascertaining the Reynolds number, respectively the dynamic viscosity of the measured medium 2.

FIGS. 2 and 2a show, respectively, longitudinal and cross sections of a second embodiment of the device 1 of the invention. Compared to the embodiment shown in FIG. 1, this embodiment differs in that only two ultrasonic sensors 14a 14b are used. As in the case of the first described form of embodiment, the in/out coupling of the ultrasonic measuring signals occurs via struts 8, however these struts 8 are interrupted. Due to the interrupted sound conduction, measuring signals are available, which are better evaluatable. Again, the measuring is limited to ascertaining the flow of the measured medium 2 in the central region 16 of the pipeline/measuring tube.

Figure 3:
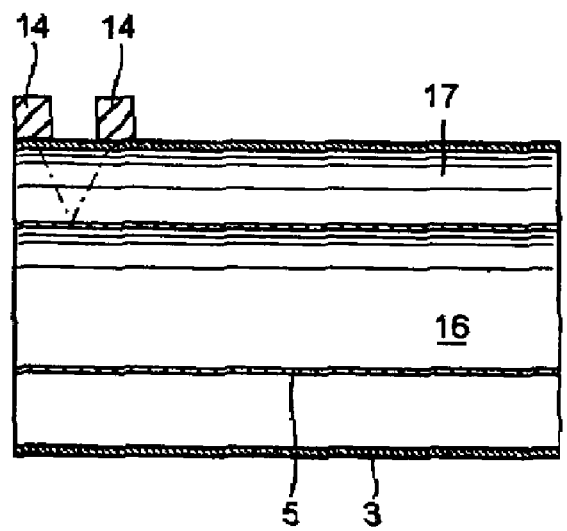
FIG. 3 a longitudinal section through a third embodiment of the device of the invention with two ultrasonic sensors and a tubular reflector with round cross section.

While, in the case of the embodiments shown in FIGS. 1, 1a, 2, 2a, defined edge regions 17 are omitted in the ascertaining of the flow, such being achieved by the in- and out-coupling of the ultrasonic measuring signals via the struts, the solution shown in FIGS. 3 and 3a limits itself to ascertaining flow in the edge region 17. In this solution, the ultrasonic measuring signals emitted from one ultrasonic transducer 14a, 14b reflected on the tubular reflector element 5 and received by the other ultrasonic transducer 14b, 14a.

Figure 4A:
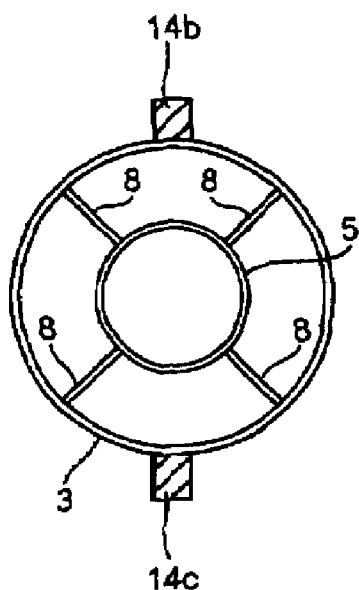
FIG. 4*a* cross section of the embodiment of the device of the invention shown in FIG. 4.
Figure 4:
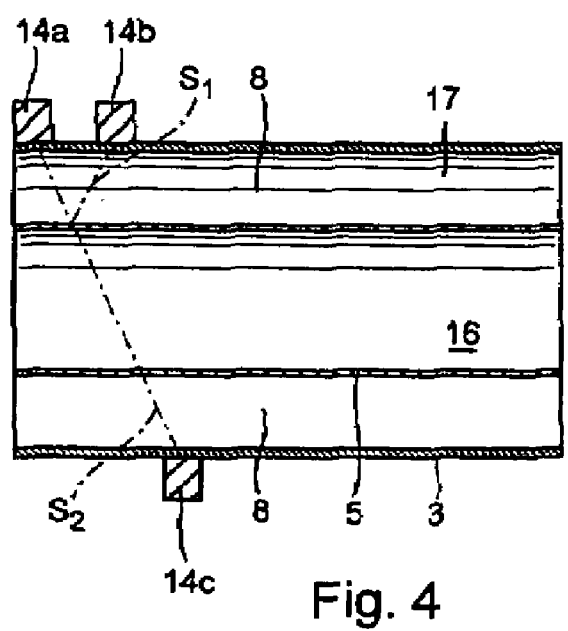
FIG. 4 a longitudinal section through a fourth embodiment of the device of the invention with three ultrasonic sensors and a tubular reflector with round cross section.
Figure 6A:
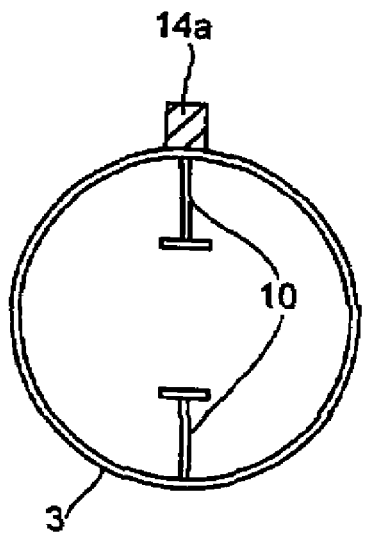
FIG. 6*a* a cross section of the embodiment of the device of the invention shown in FIG. 6.
Figure 6:
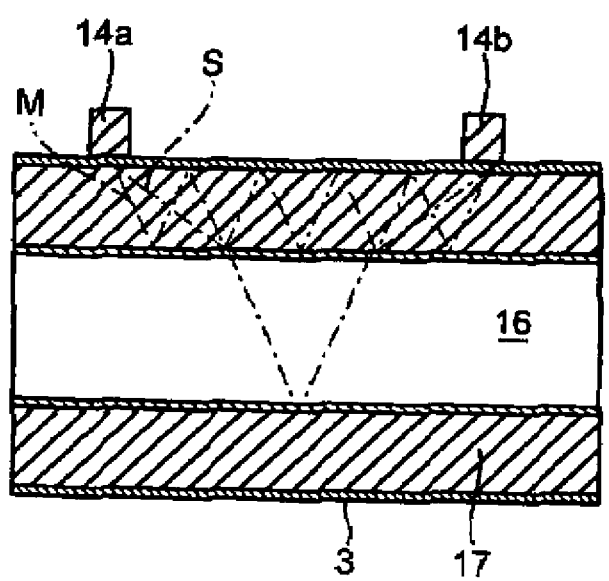
FIG. 6 a longitudinal section through a sixth embodiment of the device of the invention with two ultrasonic sensors and an in/out coupling via struts of a T-shaped reflector.
Figure 7A:
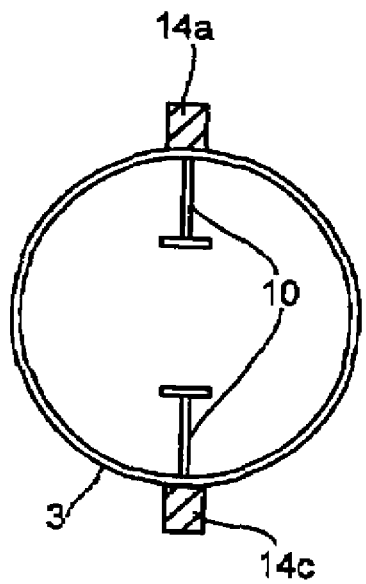
FIG. 7*a* a cross section of the embodiment of the device of the invention shown n FIG. 7.
Figure 7:
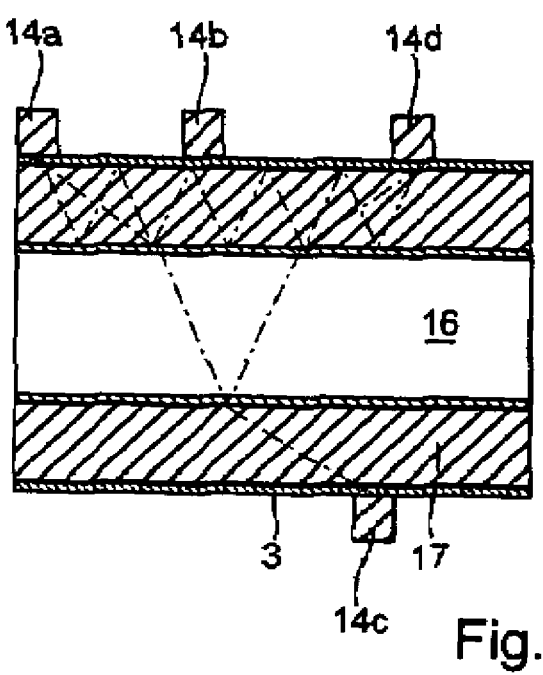
FIG. 7 a longitudinal section through a seventh embodiment of the device of the invention, with four ultrasonic sensors and an in/out coupling via struts of a T-shaped reflector.

The solution shown in FIGS. 4, 4a possesses, in addition to the solution shown in FIGS. 3, 3a, an additional, oppositely lying, ultrasonic transducer 14c. With this solution, it is possible to ascertain the flow of the measured medium 2 in the pipeline/measuring tube 3 both for the edge region 17 and for the central region 16 independently of one another.

The embodiment of the device 1 of the invention shown in FIGS. 5 and 5a differs from the above-described form of embodiment (FIGS. 4, 4a) in the shape of the reflector element 9—this reflector element has a triangular cross section. Reflector element 9 is so dimensioned that it is affixed at its vertex regions to the inner surface 6 of the pipeline/measuring tube 3.

FIGS. 6, 6a, 7, 7a show different embodiments of the device 1 of the invention, with both embodiments being equal as regards the fact that the reflector elements 10 are here T-shaped. The differences lie in the number and arrangement of the ultrasonic transducers 14.

Figure 8A:
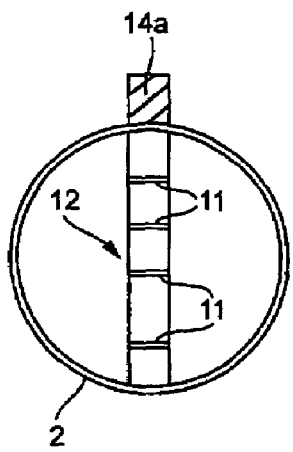
FIG. 8*a* a cross section of the embodiment of the device of the invention shown in FIG. 8.
Figure 8:
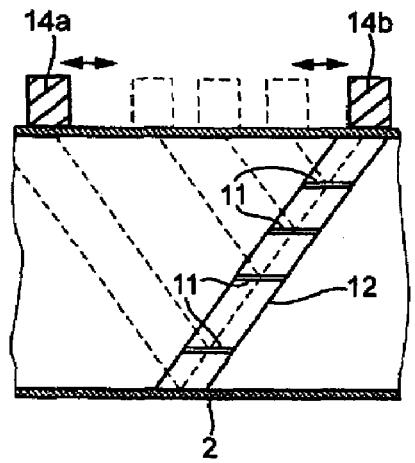
FIG. 8 a longitudinal section through an eighth embodiment of the device of the invention with one fixed ultrasonic sensor and one shiftable ultrasonic sensor and with reflector platelets.

An interesting variant of the device 1 of the invention is presented in FIGS. 8 and 8a, where a plurality of reflector platelets 11 are arranged in a ladder-shaped structure. The individual reflector platelets 11 form the mutually spaced rungs of the ladder 12. In order that the ultrasonic measuring signals are reflected on the reflector platelets 11 (and thus the travel time information is available from different regions of the pipeline/measuring tube 3), an alternative provides corresponding shifting of at least one ultrasonic transducer 14a, 14b along the connecting line of the two transducers 14a, 14b. Alternatively, also a multiplicity of ultrasonic transducers 14 can be provided at the indicated positions. Likewise, another option is to use ultrasonic transducers 14 that have a large angle of divergence, so that the ultrasonic measuring signals are emitted over a relatively broad spacial region and correspondingly have the ability to receive the ultrasonic measuring signals reflected on the reflector platelets 11. Furthermore, the ultrasonic transducers 14 can have a multiplicity of piezoelectric elements as emitting and/or receiving elements, with the emitting and/or receiving elements being arranged in an array. By suitable activating of the emitting and/or receiving elements by the control/evaluation unit 4, different radiating/receiving angles, and, thus, sound paths with different angular directions, can be implemented.

Figure 9A:
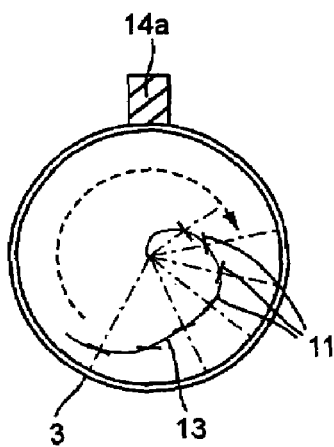
FIG. 9*a* a cross section of the embodiment of the invention shown in FIG. 9.
Figure 9:
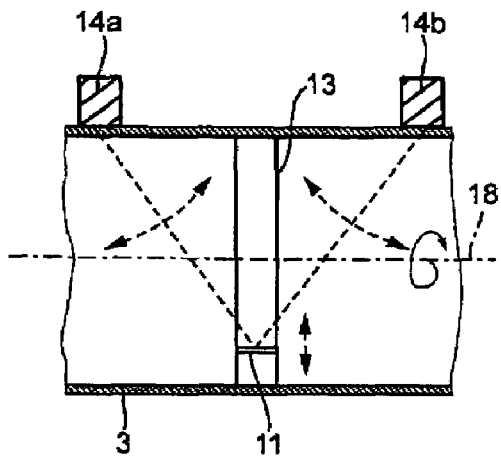
FIG. 9 a longitudinal section through a ninth embodiment of the device of the invention with two ultrasonic sensors and with reflector platelets positionable in the sound path.

A last embodiment of the device 1 of the invention is presented in FIGS. 9 and 9a. The reflector platelets 11 are here so spaced and aligned in a helix, or spiral, 13, that each reflector platelet 11 is rotated into the sound path of the ultrasonic transducers 14a, 14b by rotation of the spiral 13 about its longitudinal axis. The rotating of the spiral can occur either stepwise or continuously. By this embodiment, a high resolution of the flow profile of a measured medium 2 in the pipeline/measuring tube 3 can be achieved while using only two ultrasonic transducers 14, 15.

The invention claimed is:

1. A device for ascertaining and/or monitoring volume and/or mass flow of a medium flowing through a pipeline/measuring tube of a given inner diameter, comprising:
   at least two ultrasonic transducers, which emit and/or receive ultrasonic measuring signals along defined sound paths;
   a control/evaluation unit, which ascertains volume and/or mass flow of the medium in the pipeline/measuring tube on the basis of the ultrasonic measuring signals according to the travel-time difference principle; and
   at least one reflector element is provided in an interior of the pipeline/measuring tube, wherein:
   said reflector element has a defined distance from an inner surface of the pipeline/measuring tube; and
   said reflector element is arranged in a sound path of the ultrasonic measuring signals in the pipeline/measuring tube.

2. The device as claimed in claim 1, wherein:
   the flow measuring device is a clamp-on flow measuring device or an inline measuring device integrated into the pipeline.

3. The device as claimed in claim 1, wherein:
   said at least one reflector element is a tubular reflector element.

4. The device as claimed in claim 3, wherein:
   said tubular reflector element or elements is/are arranged concentrically in the pipeline/measuring tube.

5. The device as claimed in claim 3, wherein:
   between an outer surface of said tubular reflector element and an inner surface of the pipeline/measuring tube, struts are provided, via which said tubular reflector element is fixed in the pipeline/measuring tube.

6. The device as claimed in claim 5, wherein:
   said reflector element or elements are embodied with said struts in essentially T-shape.

7. The device as claimed in claim 6, wherein:
   said ultrasonic transducers are so arranged that the ultrasonic measuring signals are coupleable via said struts into, or out of, an inner region of said tubular reflector element or said T-shaped reflector element.

8. The device as claimed in claim 4, wherein:
   said tubular element has an n-polygonal cross section, wherein n is a natural number with $n \geq 3$.

9. The device as claimed in claim 8, wherein:
said tubular, n-polygonal element is embodied such that its outer diameter is essentially equal to an inner diameter of the pipeline/measuring tube; and
said tubular element is connected at regions of vertices with the pipeline/measuring tube.

10. The device as claimed in claim 1, wherein:
said reflector element or elements is/are disk-shaped reflector platelet(s), which are so embodied and/or arranged that they represent a negligible flow resistance for the flowing medium.

11. The device as claimed in claim 10, wherein:
said control/evaluation unit moves said reflector platelet or platelets via a mechanism into, respectively out of, the sound path of the ultrasonic measuring signals emitted and received by said ultrasonic transducers.

12. The device as claimed in claim 1, wherein:
said ultrasonic transducers are so embodied that they emit and/or receive ultrasonic measuring signals, or sound fields, over a predetermined spatial region.

13. The device as claimed in claim 12, wherein:
said ultrasonic transducers have a plurality of piezoelectric elements as emitting and/or receiving elements; and
emitting and/or receiving elements are arranged in an array.

* * * * *